Jan. 8, 1935. I. J. CLARK Re. 19,414

VALVE SPRING COMPRESSOR

Original Filed Nov. 14, 1931 2 Sheets-Sheet 1

Inventor
I. J. Clark
By Watson E. Coleman
Attorney

Jan. 8, 1935. I. J. CLARK Re. 19,414

VALVE SPRING COMPRESSOR

Original Filed Nov. 14, 1931 2 Sheets-Sheet 2

Inventor

I. J. Clark

By Watson E. Coleman

Attorney

Reissued Jan. 8, 1935

Re. 19,414

UNITED STATES PATENT OFFICE 19,414

VALVE SPRING COMPRESSOR

Ira J. Clark, Fort Morgan, Colo.

Original No. 1,871,498, dated August 16, 1932, Serial No. 575,121, November 14, 1931. Application for reissue August 7, 1934, Serial No. 738,843

8 Claims. (Cl. 29—86.3)

This invention relates to a valve spring compressor for use in assembling or repairing internal combustion engines, and has for its principal object the provision of a device of this character which will be adaptable to a wide variety of different types of invention; which can be rapidly and easily placed in position without interference with automobile hoods, tie rods, etc.; and which will compress relatively stiff springs with relatively little effort.

Another object is to so construct the lifter that it will automatically center and hold itself upon the valve head; so that it may be easily adjusted to valve stems of various lengths; so that it will be self-locking to hold the spring in the compressed position without the use of latches, ratchets, etc.; and so that it may be locked in any desired position of intermediate compression.

A further object is to provide a construction for the spring lifting extremity which will be sufficiently rigid to withstand the pressure of a spring of maximum strength, and yet will be of relatively light weight construction.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 3 is a vertical section through the compressor, taken on the line 3—3, Fig. 1.

Fig. 6 is a detail section, taken on the line 6—6, Fig. 1.

Figure 1:
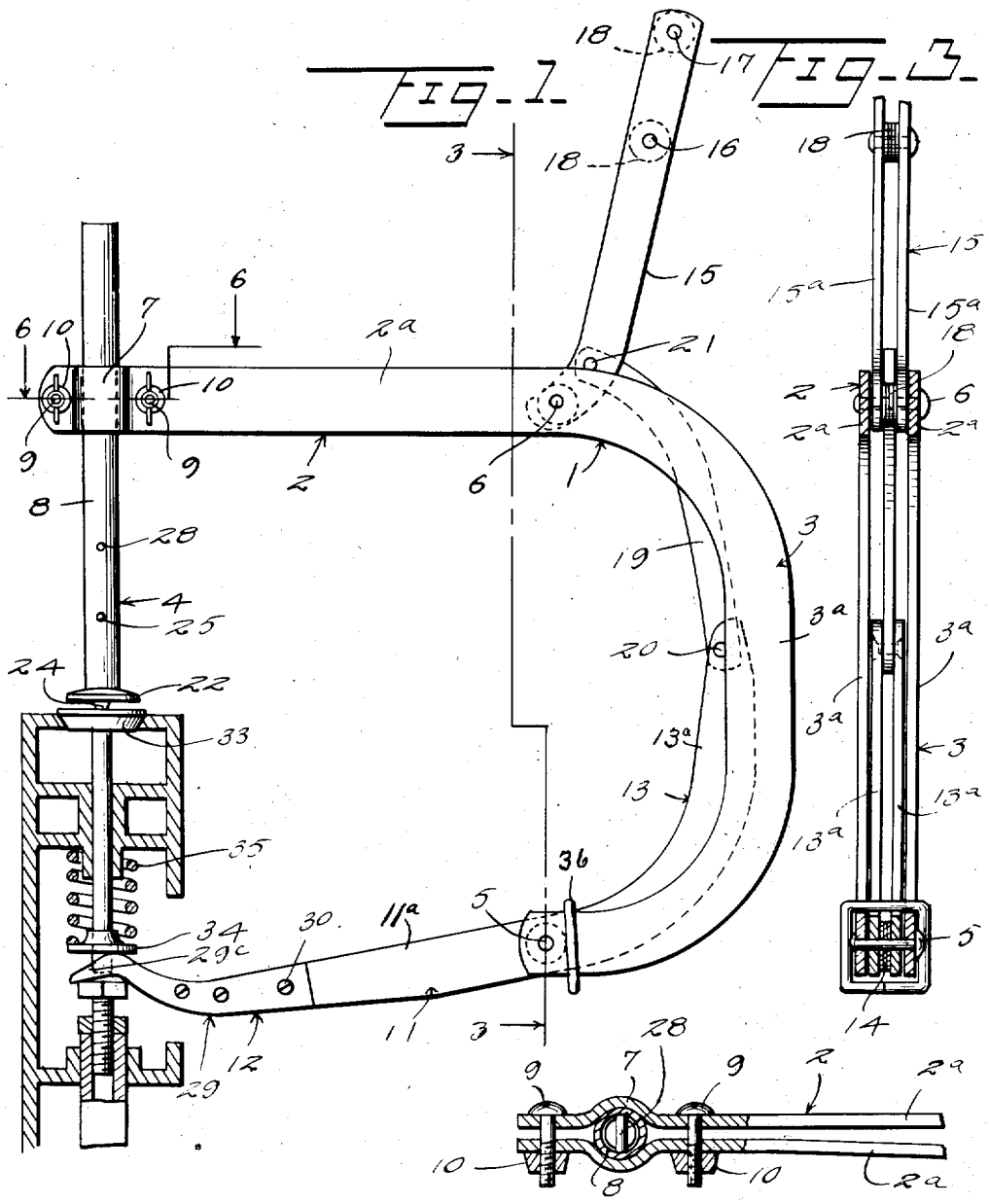
Fig. 1 is a side elevation of the improved spring compressor illustrating it in the open position ready for actuation to compress a valve spring.

The valve spring compressor comprises a frame 1 consisting of a horizontal arm 2 and a vertical arm 3. The arm 2 is provided at its front end with valve head engaging means 4, the arm 3 extends downwardly from the rear end of the arm 2. The arm 2 is preferably straight, and the arm 3 is longitudinally curved and has its lower end position directly below the rear end of the arm 2. The frame 1 is made from two flat bars arranged in opposed relation and connected together by rivets 5 and 6. Those portions of the bars constituting the arm 2 are designated 2*a*, and those portions of the bars constituting the arm 3 are designated 3*a*.

The arm portions 2*a* are laterally offset near their front ends to provide a cylindrical socket 7 which extends vertically through the arm 2 and which is provided for the reception of a valve standard 8 constituting a part of the valve head engaging means 4. Bolts 9 provided with thumb nuts 10 extend through the arm portions 2*a* at opposite sides of the socket 7, and provide means by which the sections of the socket may be moved toward each other or freed for movement away from each other. The movement of the sections of the socket 7 in the direction of each contracts the socket, and the movement of the sections of the socket away from each other expands the socket. When the socket 7 is expanded the standard 8 may be adjusted upwardly and downwardly on the arm 2, and when the socket is contracted the push rod is held against accidental movement from its adjusted position.

A lever 11 located below the arm 2, is pivotally connected at its rear end by the rivet 5, to the lower end of the arm 3, and is provided at its front or free end with spring seat engaging means 12. The pivoted end of the lever 11 is located between the arm portions 3*a*, and curving upwardly from its pivoted end is an arm 13 which is also located between these portions. The lever 11 and its arm 13 are also made from two flat bars, those portions of the bars constituting the lever being designated 11*a*, and those portions of the bars constituting the lever arm being designated 13*a*. Washers 14 are mounted upon the rivet 5 at one end of the lever portions 11*a*, and serve to hold these portions in relatively spaced relation.

A hand lever 15 is pivotally connected at one end of the rear end of the arm 2 by the rivet 6, and normally extends upwardly and rearwardly from its pivot. The hand lever 15 is made of two flat bars designated 15*a* connected together near their free ends by rivets 16 and 17, and held in spaced relation by washers 18 mounted on these rivets and the rivet 6. A link 19 located between the arm portions 3*a*, is pivotally connected, as at 20, to and between the upper ends of the arm portions 13*a* and is pivotally connected, as at 21, to and between the lever portions 15*a* at points close to the pivot 6 of the lever.

The standard 8 is of hollow formation, and is provided at its lower end with a foot piece 22 of hollow spherical formation and extending in all directions laterally beyond the push bar. A pin 23 having a pointed lower end 24 located at the center of the foot piece 22, is slidably mounted in the push bar 8 to permit the pin to move downwardly and upwardly with respect to the foot piece. The upward and downward movement of the pin 23 is limited by a pin 25 carried by and extending diametrically across the push bar 8 and also extending through a vertical slot 26 in the pin 23. The pin 23 normally occupies a position with its lower end extending below the foot piece 22, and it is yieldingly held in this position by a spring 27 mounted in the push bar 8 between the upper end of the pin and a pin 28 fixed to and extending diametrically across the push bar 8.

The spring seat engaging means 12 comprises jaws 29 secured to the front ends of the lever 11. The jaws 29 are of channel formation and are arranged with their open sides in opposed relation. The jaws 29 comprise shanks 29*a* which receive and are secured, as at 30, to the front ends of the lever portions 11*a*. Shanks 29*a* curve upwardly and forwardly and gradually decrease in width or vertical dimension from their rear to their front ends. The jaws 29 also comprise spring seat engaging members 29*b* which extend forwardly from the upper ends of the shanks 29*a*, and flanges 29*c* which extend upwardly from the outer edges of the spring seat engaging members. The spring seat engaging members 29*b* and their flanges 29*c* form continuations of the lower flanges and the webs of the shanks 29*a* respectively, and are offset laterally outward with respect to the shanks. The upper flanges of the shanks 29*a* terminate at the rear ends of the flanges 29*c*. As the shanks 29*a* are of channel formation, and as the spring seat engaging members 25*b* and their flanges 29*c* are formed integrally with the shanks, the jaws while slim and trim are so strong as not to yield under the pressure necessary to compress the strongest valve spring. The lever portions 11*a* hold the jaws 29 in relatively spaced relation ready for application to the spring seat. The distance between the jaws may be varied so as to adapt them for application to spring seats of different sizes through the medium of a bolt 31 passing through the lever portions 11*a* and the jaw shanks 29*a*, the head of the bolt contacting with the outer side of one of the shanks, and a nut 32 on the bolt contacting with the outer side of the other shank.

Figure 2:
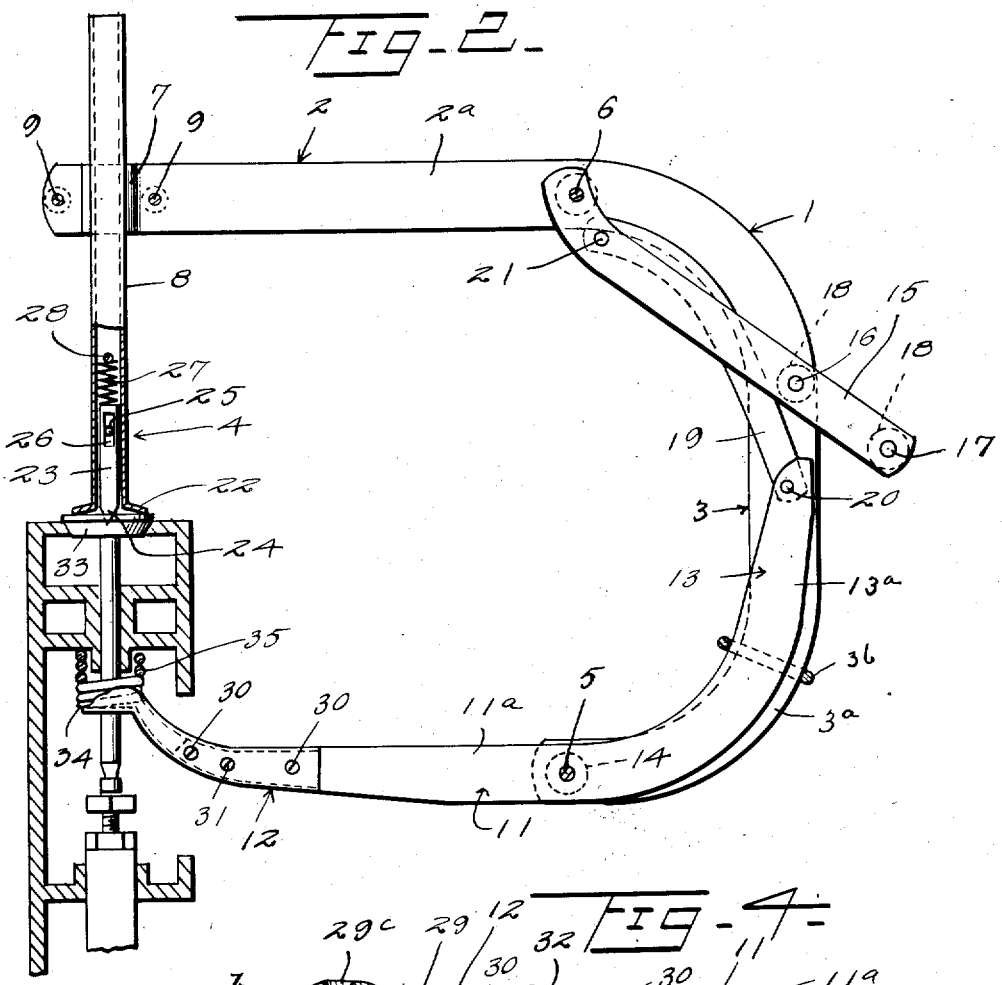
Fig. 2 is a similar view illustrating the compressor in the closed position, maintaining the valve spring under compression.
Figure 4:
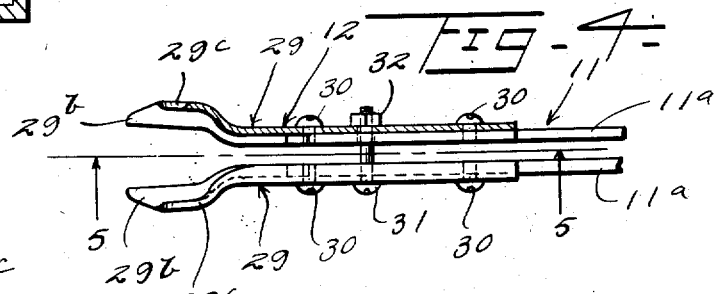
Fig. 4 is a detail view looking downwardly on the spring engaging jaws of the compressor. This view is partially in section.
Figure 5:
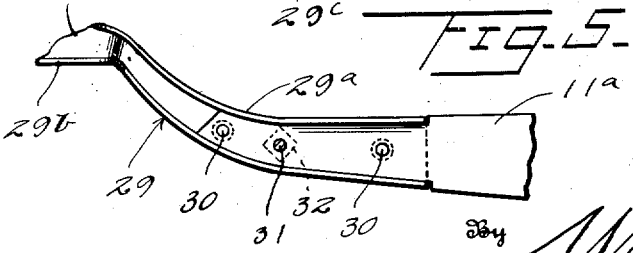
Fig. 5 is a detail view looking toward the inner face of one of the spring engaging jaws. This view is taken on the line 5–5, Fig. 4.

In practice, to adapt the valve lifter for application to a valve, the hand lever 15 is actuated to swing the lever 11 into its lowest adjusted position with respect to the arm 2 if the lever 11 is not already in such position. The pin 23 extends below the foot piece 22, and during the initial phase of the application of the compression the pointed lower end of the pin is engaged with the valve head 33, and during the next final phase of the application of the compression the jaws 29 are engaged with the seat 34 of the valve spring 35. The pin 23 centers the foot piece 22 on the valve head 33, and the jaw members 29*b* and 29*c* contact with the lower side and edge, respectively, of the valve spring seat 34. The hand lever 15 now occupies an upwardly and rearwardly inclined position, as shown in Fig. 1, and it is swung from this position into a downwardly and rearwardly inclined position, as shown in Fig. 2. During this actuation thereof, the hand lever 15 moves between the arm members 3*a*, the link 19 moves between the lever members 15*a*, and the free end of the lever 11 moves upwardly. During the consequent upward movement of the jaws 29, the foot piece 22 moves downwardly with relation to the pin 23 into contact with the valve head 33. After the foot piece 22 contacts with the valve head 33 the jaws compress the spring 35. During this actuation of the hand lever 15, the link pivot 21 passes from a point above to a point below the lever pivot 6, and the downwardly acting force applied to the lever 11 by the compressed spring 35 acts through the arm 13 and link 19 against the hand lever 15 in a direction which tends to move this lever downwardly. Due thereto, and as the downward movement of the hand lever 15 is limited by the rivet 16 contacting with the rear edge of the link 19, the lever 11 is positively held against accidental downward movement.

The foot piece 22 and the jaws 29 are thus held in their adjusted and spring compressing position. All possibility of the foot piece 22 becoming accidentally displaced from the valve head 33 is prevented by the engagement of the pin 23 with the valve head. There is no possibility of the spring compressor becoming accidentally displaced either while it is being applied or after its application and actuation to effect the compression of the spring. A loop 36 surrounding the vertical arm 3 and the lever arm 13 normally occupies a position close to the pivot 5 of the lever 11, as shown in Fig. 1. In this position thereof, the loop 36 will not interfere with the actuation of the lever 11. When conditions are such that the hand lever 15 cannot be swung into its lowest or locking position, the lever 11 is held against downward movement from its adjusted position by the loop 36 which to accomplish this is moved upwardly from its normal position into embracing relation with their arms 3 and 13, as shown in Fig. 2. The jaws 29 are slim and trim, may be easily engaged with the spring seat 34, and will when the spring 35 is under compression provide the greatest possible room for the application or removal of the pin or key employed to support the spring seat on the valve stem. The channel formation of the jaws 29 permits them to be made slim and trim and yet strong enough to compress the strongest valve spring. To release the valve lifter for removal from the valve it is only necessary to swing the hand lever 15 upwardly and forwardly.

Having thus described the invention, what is claimed and desired secured by Letters Patent is:—

1. In a valve spring compressor: a frame having a horizontal arm and a vertical arm extending downwardly from one end of the horizontal arm, valve head engaging means carried by the other end of the horizontal arm, a lever located below the horizontal arm and pivoted at one end to the vertical arm, spring seat engaging means carried by the free end of the lever, an arm extending upwardly from the pivoted end of the lever, a hand lever pivoted at one end to the horizontal arm; and a link pivoted to the upper end of the lever arm and to the hand lever, at a point close to the pivot of such lever.

2. In a valve spring compressor: a frame having a horizontal arm and a vertical arm extending downwardly from one end of the horizontal arm, valve head engaging means carried by the other end of the horizontal arm, a lever located below the horizontal arm and pivoted at one end to the vertical arm, spring seat engaging means carried by the free end of the lever, an arm extending upwardly from the pivoted end of the lever, a hand lever pivoted at one end to the horizontal arm, a link pivoted to the upper end of the lever arm and to the hand lever at a point close to the pivot of such lever, and a loop embracing the vertical arm and the lever arm and movable thereon into a position to hold the lever against movement and into a position to free the lever for movement.

3. In a valve spring compressor: a frame having a horizontal arm and a vertical arm extending downwardly from the rear end of the horizontal arm, the vertical arm being curved and having its lower end located below said end of the horizontal arm, valve head engaging means carried by the front end of the horizontal arm, a lever located below the horizontal arm and pivoted at its rear end to the lower end of the vertical arm, spring seat engaging means carried by the front end of the lever, an arm curving upwardly from the rear end of the lever, a hand lever pivoted at one end to the rear end of the horizontal arm and normally occupying an upwardly and rearwardly extended position on such arm, and a curved link pivoted to the upper end of the lever arm and to the hand lever at a point above and rearwardly of the pivot of such lever, the lever being adapted to be swung downwardly to swing the lever upwardly and adapted to occupy a downwardly and rearwardly extended position with relation to the horizontal arm with the pivot of the link below its pivot to hold the lever in its upwardly adjusted position.

4. In a valve spring compressor: a frame having a horizontal arm and a vertical arm extending downwardly from the rear end of the horizontal arm, the vertical arm being curved and having its lower end located below said end of the horizontal arm, valve head engaging means carried by the front end of the horizontal arm, a lever located below the horizontal arm and pivoted at its rear end to the lower end of the vertical arm, spring seat engaging means carried by the front end of the lever, an arm curving upwardly from the rear end of the lever, a hand lever pivoted at one end to the rear end of the horizontal arm and normally occupying an upwardly and rearwardly extended position on such arm, a link pivoted to the upper end of the lever arm and to the hand lever at a point above and rearwardly of the pivot of such lever, the lever being adapted to be swung downwardly to swing the lever upwardly and adapted to occupy a downwardly and rearwardly extended position with relation to the horizontal arm with the pivot of the link below its pivot to hold the lever in its upwardly adjusted position, and a loop embracing the vertical arm and the lever arm and movable thereon into a position to hold the lever against movement and into a position to free the lever for movement.

5. A valve spring compressor comprising: a frame; a horizontal arm on said frame; a vertical arm extending downwardly from one extremity of said horizontal arm, thence forwardly to a termination below said horizontal arm; a first lever pivoted intermediate its extremities to the forwardly extending extremity of said vertical arm, thence curving upwardly on a contour similar to the forwardly extending lower extremity of said vertical arm; a hand lever pivoted to said frame; a link connecting said hand lever to the upwardly curved extremity of said first lever; spring engaging means on the forward extremity of said first lever; and valve engaging means on the forward extremity of said horizontal arm.

6. A valve spring compressor comprising: a pair of similar, spaced-apart, U-shaped frame members each having a relatively long upper horizontal arm; and a relatively short lower horizontal arm; a compressing lever pivoted intermediate its extremities between said frame members at the extremity of said shorter arms; a hand lever pivoted between said frame members and extending rearwardly therefrom; a link positioned between said frame members and connecting said hand lever to one extremity of said compressing lever; spring engaging means on the other extremity of said compressing lever; and a valve engaging member clamped between said two frame members adjacent the forward extremities of said longer horizontal arms.

7. A valve spring compressor comprising: a frame; a horizontal arm on said frame; a vertical arm extending downwardly from one extremity of said horizontal arm, thence forwardly to a termination below said horizontal arm; a first lever pivoted intermediate its extremities to the forwardly extending extremity of said vertical arm; a hand lever secured to and extending rearwardly from said frame; a link extending from said hand lever to the rearward extremity of said first lever; a spring engaging member on the forward extremity of said first lever; and a valve engaging member on the forward extremity of said horizontal arm, the connecting point between said link and said hand lever being positioned so that it may be swung between the pivot of said hand lever and the rearward extremity of said first lever to provide a dead center or locking position.

8. A valve spring compressor comprising: a U-shaped frame consisting of a vertical portion connecting two horizontal portions, the lower horizontal portion being shorter than the upper horizontal portion; a lever extending forwardly from a pivot at the extremity of the shorter lower horizontal portion, the rearward extremity of said lever extending upwardly within the outline of said U-shaped frame; a hand lever pivoted to said frame and extending normally upward therefrom; a link connecting said hand lever to the upturned extremity of said first lever, said link being positioned within the outline of said frame; valve engaging means at the extremity of said upper frame member; and spring engaging means at the forward extremity of said first lever.

IRA J. CLARK.